[United States Patent — Eom et al. — US 10,167,840 B1 — Jan. 1, 2019]

(54) APPARATUS AND METHOD FOR CONTROLLING IGNITION TIMING OF ENGINE

(71) Applicants: Hyundai Motor Company, Seoul (KR); Kia Motors Corporation, Seoul (KR)

(72) Inventors: Tae Kwang Eom, Whasung-Si (KR); Kyung Wook Choi, Whasung-Si (KR); Kyu Sup Kim, Whasung-Si (KR); Jeong Hwan Paeng, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/806,069

(22) Filed: Nov. 7, 2017

(30) Foreign Application Priority Data

Jun. 30, 2017 (KR) .................... 10-2017-0083583

(51) Int. Cl.
*F02P 5/15* (2006.01)
(52) U.S. Cl.
CPC ................. *F02P 5/1502* (2013.01)
(58) Field of Classification Search
CPC .................. F02P 5/15; F02P 5/1502
See application file for complete search history.

(56) References Cited

U.S. PATENT DOCUMENTS

| 5,485,161 | A | 1/1996 | Vaughn |
| 6,370,472 | B1 | 4/2002 | Fosseen |
| 6,522,024 | B1 * | 2/2003 | Takaoka .................. B60K 6/445 |
| | | | 290/40 C |
| 7,987,667 | B2 | 8/2011 | Meier et al. |
| 8,024,118 | B2 | 9/2011 | Bradley et al. |
| 9,151,214 | B2 | 10/2015 | Glugla et al. |
| 9,304,208 | B2 | 4/2016 | Lim et al. |
| 2012/0073892 | A1 | 3/2012 | Hunter |
| 2013/0314278 | A1 | 11/2013 | Lim et al. |
| 2016/0137173 | A1 | 5/2016 | Shah et al. |
| 2016/0245240 | A1 | 8/2016 | Pursifull et al. |

FOREIGN PATENT DOCUMENTS

| EP | 2 667 221 A2 | 11/2013 | |
| JP | 09088786 A * | 3/1997 | .............. F02P 5/152 |

OTHER PUBLICATIONS

Cho, Yoonho et al., *Method of Decreasing the Deviation of Corrected Engine Torque using Knock Correction Rate in Gasoline Engine Performance Test on Dynamometer*, Transactions of KSAE, 2008, pp. 1-7, vol. 15, No. 4, Republic of Korea.

* cited by examiner

*Primary Examiner* — Hieu T Vo
(74) *Attorney, Agent, or Firm* — Morgan, Lewis & Bockius LLP

(57) ABSTRACT

An apparatus and a method for controlling an ignition timing of an engine may include a storage storing a map table in which correction torques are recorded; a receiver receiving first atmospheric information corresponding to a current position of a vehicle; a detector configured for measuring second atmospheric information corresponding to the current position of the vehicle; and a controller configured for detecting a corresponding correction torque from the map table on the basis of the first atmospheric information and the second atmospheric information, correcting a required torque using the detected correction torque, and controlling an ignition timing of an engine on the basis of the corrected required torque.

18 Claims, 5 Drawing Sheets

APPARATUS AND METHOD FOR CONTROLLING IGNITION TIMING OF ENGINE

CROSS-REFERENCE(S) TO RELATED APPLICATIONS

The present application claims priority to Korean Patent Application No. 10-2017-0083583, filed on Jun. 30, 2017, the entire contents of which is incorporated herein for all purposes by this reference.

BACKGROUND OF THE INVENTION

Field of the Invention

The present invention relates to an apparatus and a method for controlling an ignition timing of an engine, and, more particularly, the present invention relates to a technique for controlling an ignition timing of an engine by considering a state of air drawn into a cylinder of the engine.

Description of Related Art

In general, an apparatus for controlling an ignition timing of an engine includes: an intake air temperature detector configured to detect a temperature of external air drawn through an air cleaner to output a detected signal; an intake air negative pressure detector configured to detect a negative pressure of the external air being drawn to output a detected signal; a cooling water temperature detector configured to detect a temperature of cooling water that cools the engine to output a detected signal; and a humidity detector mounted on one side of a suction pipe to which the external air is drawn, and detecting a humidity of the intake air to output a detected signal, and determines an ignition timing on the basis of the signals output from the detectors.

A conventional apparatus for controlling an ignition timing of an engine may correct the ignition timing of the engine on the basis of a relative humidity of the air drawn into a cylinder. Since the relative humidity varies according to a temperature of an intake system (e.g., cylinder) of the engine, an optimum ignition timing may not be detected.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling an ignition timing of an engine, configured for correcting a required torque on the basis of a correction torque corresponding to a difference of $\dot{m}_1 - \dot{m}_2$ between a mass flow rate $\dot{m}_1$ of moist air drawn into a cylinder of the engine at a current atmospheric pressure and a mass flow rate $\dot{m}_2$ of moist air drawn into the cylinder of the engine at a standard atmospheric pressure, and a ratio of a mass of water vapor to a total mass of moist air drawn into the cylinder of the engine, determining the ignition timing of the engine with high accuracy, regardless of the temperature.

The object of the present invention is not limited to the foregoing object, and any other objects and advantages not mentioned herein will be clearly understood from the following description. The present inventive concept will be more clearly understood from exemplary embodiments of the present invention. Furthermore, it will be apparent that the objects and advantages of the present invention can be achieved by elements and features claimed in the claims and a combination thereof.

According to various aspects of the present invention, an apparatus for controlling an ignition timing of an engine may include a storage configured to store a map table in which correction torques are recorded; a receiver receiving first atmospheric information corresponding to a current position of a vehicle; a detector configured for measuring second atmospheric information corresponding to the current position of the vehicle; and a controller configured for detecting a corresponding correction torque from the map table on the basis of the first atmospheric information and the second atmospheric information, correcting a required torque using the detected correction torque, and controlling an ignition timing of an engine on the basis of the corrected required torque.

The controller may be configured to detect the correction torque from the map table on the basis of a mass of water vapor and a mass of moist air drawn into a cylinder of the engine.

The controller may be configured to detect the correction torque from the map table, on the basis of a difference between a mass flow rate of moist air drawn into the cylinder of the engine at a current atmospheric pressure and a mass flow rate of moist air drawn into the cylinder of the engine at a standard atmospheric pressure, and a ratio of the mass of the water vapor to a total mass of the moist air drawn into the cylinder of the engine.

The first atmospheric information may include at least one of atmospheric pressure, atmospheric temperature, relative humidity, air volume, and altitude.

The detector may include at least one of a barometric pressure detector, an intake air temperature detector, and a mass airflow detector.

The controller may be configured to compare an atmospheric pressure in the first atmospheric information with an atmospheric pressure in the second atmospheric information to verify the validity of the first atmospheric information and the second atmospheric information.

The controller may be configured to recognize the validity of the first atmospheric information and the second atmospheric information when a difference between the atmospheric pressure in the first atmospheric information and the atmospheric pressure in the second atmospheric information is within a predetermined threshold.

The controller may be configured to verify the validity of the first atmospheric information and the second atmospheric information on the basis of a specific humidity determined using the first atmospheric information and the second atmospheric information.

The controller may be configured to recognize the validity of the first atmospheric information and the second atmospheric information unless the determined specific humidity exceeds a maximum specific humidity at an intake air temperature measured by the intake air temperature detector.

According to various aspects of the present invention, a method for controlling an ignition timing of an engine may include the steps of storing, by a storage, a map table in which correction torques are recorded; receiving, by a receiver, first atmospheric information corresponding to a current position of a vehicle; measuring, by a detector, second atmospheric information corresponding to the current position of the vehicle; and detecting, by a controller, a corresponding correction torque from the map table on the basis of the first atmospheric information and the second atmospheric information, correcting a required torque using the detected correction torque, and controlling an ignition timing of an engine on the basis of the corrected required torque.

The controlling step may include detecting the correction torque from the map table on the basis of a mass of water vapor and a mass of moist air drawn into a cylinder of the engine.

The controlling step may include detecting the correction torque from the map table, on the basis of a difference between a mass flow rate of moist air drawn into the cylinder of the engine at a current atmospheric pressure and a mass flow rate of moist air drawn into the cylinder of the engine at a standard atmospheric pressure, and a ratio of the mass of the water vapor to a total mass of the moist air drawn into the cylinder of the engine.

The controlling step may include verifying the validity of the first atmospheric information and the second atmospheric information by comparing an atmospheric pressure in the first atmospheric information with an atmospheric pressure in the second atmospheric information.

The controlling step may include recognizing the validity of the first atmospheric information and the second atmospheric information when a difference between the atmospheric pressure in the first atmospheric information and the atmospheric pressure in the second atmospheric information is within a predetermined threshold.

The controlling step may include verifying the validity of the first atmospheric information and the second atmospheric information on the basis of a specific humidity determined using the first atmospheric information and the second atmospheric information.

The controlling step may include recognizing the validity of the first atmospheric information and the second atmospheric information unless the determined specific humidity exceeds a maximum specific humidity at an intake air temperature measured by the intake air temperature detector.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
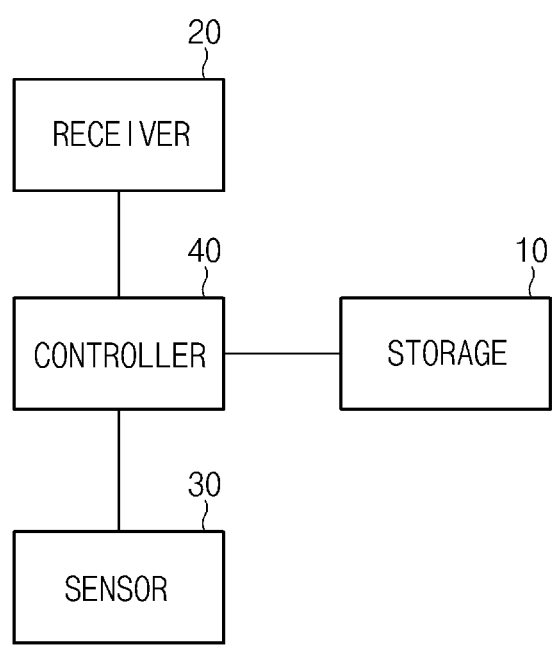
FIG. 1 illustrates a configuration of an apparatus for controlling an ignition timing of an engine, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms including first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a configuration of an apparatus for controlling an ignition timing of an engine, according to an exemplary embodiment of the present invention.

As illustrated in FIG. 1, the apparatus for controlling an ignition timing of an engine, according to the exemplary embodiment of the present invention, may include a storage 10, a receiver 20, a detector 30, and a controller 40.

Figure 2:
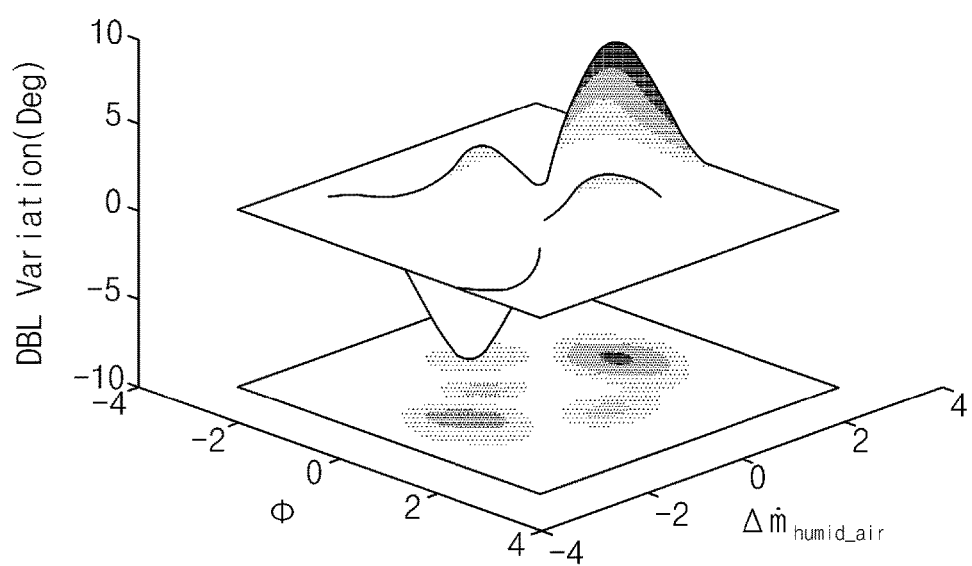
FIG. 2 illustrates an exemplary embodiment of a map table, according to an exemplary embodiment of the present invention.

With regard to each of the aforementioned elements, first, the storage 10 may store a map table in which correction torques (DBL variations) are recorded, each correction torque corresponding to a difference $\Delta \dot{m}_{humid\_air}$ between a mass flow rate of moist air drawn into a cylinder of an engine at a current atmospheric pressure and a mass flow rate of moist air drawn into the cylinder of the engine at a standard atmospheric pressure and a value $\varphi = m_{vapor}/m_{humid\_air}$ representing a ratio of a mass $m_{vapor}$ of water vapor to a total mass $m_{humid\_air}$ of the moist air drawn into the cylinder of the engine. The map table is illustrated in FIG. 2.

The receiver 20 may receive atmospheric information corresponding to a current position of a vehicle from an external server (for example, a Meteorological Agency server). Here, the atmospheric information may include atmospheric pressure, atmospheric temperature, relative humidity, air volume, altitude, and the like.

For example, the Meteorological Agency server may provide the atmospheric information through a weavigation service. Here, the weavigation service refers to a combination of the words "weather" and "navigation", that is, a combination of a navigation service that provides a route guide and a weather service that provides atmospheric information related to a route that a driver selects and a destination. The weavigation service may include a Transfer Protocol Expert Group (TPEG). The TPEG refers to a technique of providing real-time traffic information, weather information, travel information, and the like, to a navigation terminal of the vehicle using a digital multimedia broadcasting (DMB) frequency.

The detector 30 may include a plurality of detectors configured for measuring various atmospheric information. The detector 30 may include a barometric pressure detector, an intake air temperature detector, and a mass airflow detector.

Here, the barometric pressure detector is a semiconductor piezoresistive detector which is configured to convert pressure into voltage using a principle that a resistance value of a strain gauge changes in proportion to pressure. The intake air temperature detector is a detector which is configured to output a voltage corresponding to the temperature of air drawn into the cylinder. The mass airflow detector is a detector that configured to measure the mass of moist air drawn into the cylinder using a hot film disposed in an air passage and converts a power required to maintain the film at a reference temperature into a digital signal to output the converted signal.

The controller 40 may be configured to control the aforementioned respective elements to perform the functions thereof normally.

The controller 40 may be configured to compare the atmospheric pressure received from the receiver 20 with the atmospheric pressure measured by the barometric pressure detector to improve an accuracy in performance. In other words, when a difference between the received atmospheric pressure and the measured atmospheric pressure is within a predetermined threshold, it may be determined that the accuracy of the received atmospheric pressure and the measured atmospheric pressure is high, and thus any one of the received atmospheric pressure and the measured atmospheric pressure may be used in determining a specific humidity SH. When the difference between the received atmospheric pressure and the measured atmospheric pressure exceeds the predetermined threshold, it may be determined that the accuracy of the received atmospheric pressure is low according to a first user setting information, and thus the specific humidity may be determined on the basis of the measured atmospheric pressure; it may be determined that the accuracy of the measured atmospheric pressure is low according to second user setting information, and thus the specific humidity may be determined on the basis of the received atmospheric pressure; or it may be determined that the accuracy of the received atmospheric pressure and the measured atmospheric pressure is low according to third user setting information, and thus a process of correcting the ignition timing of the engine may not be performed.

Furthermore, the controller 40 may be configured to detect a saturated water vapor pressure at an intake air temperature measured by the intake air temperature detector. Here, the controller 40 may detect the saturated water vapor pressure at the intake air temperature measured by the intake air temperature detector on the basis of a table in which saturated water vapor pressures vary according to temperatures are recorded.

In general, when a number of water molecules entering the air is greater than a number of water molecules returning to the water surface from the air, the process is called "evaporation", and the reverse thereof is "condensation". When the number of evaporated water molecules is equal to the number of condensed water molecules, the atmosphere is saturated with water vapor.

The ability of the atmosphere to retain water vapor depends on the temperature. When retaining the maximum amount of water vapor at a provided temperature, the atmosphere is saturated, and the pressure exerted by the water vapor is called the "saturated water vapor pressure".

The amount of water vapor in the atmosphere does not exceed the amount of saturated water vapor. When the water vapor pressure in the atmosphere reaches the saturated water vapor pressure, condensation is initiated, and the saturated water vapor pressure is maintained. When the water vapor pressure is lower than the saturated water vapor pressure, the atmosphere is unsaturated.

The saturation vapor pressure is a function of temperature only, and the saturation vapor pressure over water is always greater than the saturation vapor pressure over ice of the same temperature. The present case is because a bonding force between the water molecules is stronger in a solid state than in a liquid state.

For air to reach saturation, the following method may be performed: 1) adding water vapor to the air while keeping the temperature constant, or 2) cooling the air to reach a dew point while holding the water vapor constant.

Furthermore, the controller 40 may be configured to detect a water vapor pressure $P_{vapor}$ on the basis of a detected saturated water vapor pressure $P_{sat}$ and a relative humidity HR received through the receiver 20. For example, the controller 40 may determine the water vapor pressure $P_{vapor}$ using equation 1 below.

$$HR = \frac{P_{vapor}}{P_{sat}} \qquad \text{Equation 1}$$

Furthermore, the controller 40 may be configured to determine a specific humidity SH using equation 2 below.

$$SH = P_{vapor} \times \frac{18 \text{ g/mol}}{(P_{amb} - P_{vapor}) \times 29 \text{ g/mol}} \qquad \text{Equation 2}$$

Here, $P_{amb}$ represents an atmospheric pressure measured by the barometric pressure detector and $P_{vapor}$ represents the water vapor pressure determined using equation 1.

Figure 3:
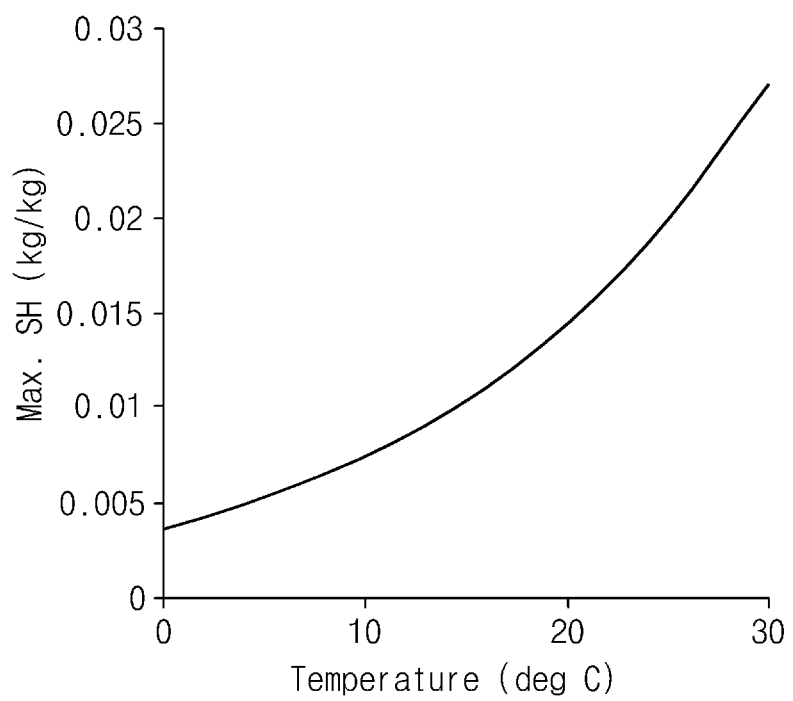
FIG. 3 illustrates variations in maximum specific humidity according to temperature, according to an exemplary embodiment of the present invention.

Furthermore, the controller 40 may be configured to verify the validity of the specific humidity determined using equation 2. For example, the controller 40 may verify the validity of the specific humidity on the basis of table 1 below. Here, table 1 is illustrated as a graph of FIG. 3.

TABLE 1

| Temperature (° C.) | $P_{sat}$ (Pa) | Maximum SH (%) |
|---|---|---|
| 0 | 609.9 | 0.003767 |
| 5 | 870 | 0.005387 |
| 10 | 1225 | 0.007612 |
| 15 | 1701 | 0.01062 |
| 20 | 2333 | 0.014659 |
| 25 | 3130 | 0.019826 |
| 30 | 2434 | 0.027125 |

When the specific humidity determined using equation 2 does not exceed a maximum specific humidity at the intake air temperature measured by the intake air temperature detector, the controller 40 may recognize the specific humidity as valid.

For example, when an intake air temperature measured by the intake air temperature detector is 10° C., and a specific humidity determined using equation 2 is 0.007533%, it may be determined that the specific humidity is valid since it does not exceed the maximum specific humidity.

When an intake air temperature measured by the intake air temperature detector is 10° C., and a specific humidity determined using equation 2 is 0.007725%, it may be determined that the specific humidity is not valid since it exceeds the maximum specific humidity.

The process of verifying the validity of the specific humidity may improve accuracy in the correction of the ignition timing of the engine.

Furthermore, the controller 40 may be configured to determine the total mass of the moist air drawn into the cylinder of the engine on the basis of the mass of the moist air measured by the mass airflow detector. Here, the controller 40 may determine the total mass $m_{humid\_air}$ of the moist air drawn into the cylinder of the engine using equation 3 below. In other words, the controller 40 may be configured to determine the mass flow rate of the moist air drawn into the cylinder to determine the total mass $m_{humid\_air}$.

$$m_{humid\_air} = \int_{T_{n-1}}^{T_n} \dot{m}_{humid\_air}(t) dt \qquad \text{Equation 3}$$

Furthermore, the controller 40 may be configured to determine the mass $m_{vapor}$ of the water vapor on the basis of the total mass $m_{humid\_air}$ of the moist air drawn into the cylinder of the engine and the specific humidity. Here, the controller 40 may be configured to determine the mass $m_{vapor}$ of the water vapor using equation 4 below.

$$SH = \frac{m_{vapor}}{(m_{humid\_air} - m_{vapor})} \qquad \text{Equation 4}$$

Furthermore, the controller 40 may be configured to determine a value φ representing the ratio of the mass $m_{vapor}$ of the water vapor to the total mass $m_{humid\_air}$ of the moist air drawn into the cylinder of the engine. Here, the controller 40 may determine the value φ using equation 5 below.

$$\Phi = \frac{m_{vapor}}{m_{humid\_air}} \qquad \text{Equation 5}$$

Furthermore, the controller 40 may be configured to determine a difference $\Delta\dot{m}_{humid\_air}$ between a mass flow rate $\dot{m}_{humid\_air}$@Pamb of moist air drawn into the cylinder of the engine at a current atmospheric pressure and a mass flow rate $\dot{m}_{humid\_air}$@Std_Patm of moist air drawn into the cylinder of the engine at a standard atmospheric pressure. Here, the controller 40 may determine the difference of the above parameters using equation 6 below.

$$\Delta\dot{m}_{humid\_air} = \dot{m}_{humid\_air}@Pamb - \dot{m}_{humid\_air}@Std\_Patm \qquad \text{Equation 6:}$$

Furthermore, the controller 40 may be configured to detect a correction torque corresponding to the determined values φ and $\Delta\dot{m}_{humid\_air}$ from the map table stored in the storage 10, and correct a required torque on the basis of the detected correction torque. Here, the required torque may be corrected by additionally applying a generally known correction torque depending on the temperature.

Furthermore, the controller 40 may be configured to control an ignition timing of the engine on the basis of the corrected required torque.

As described above, the accuracy of the ignition timing of the engine may be determined according to how accurately the required torque is corrected. According to the exemplary embodiment of the present invention, the required torque may be corrected on the basis of the mass ratio φ and the result of equation 6, which are not affected by temperature, and thus the accuracy of the ignition timing of the engine may be improved.

Figure 4:
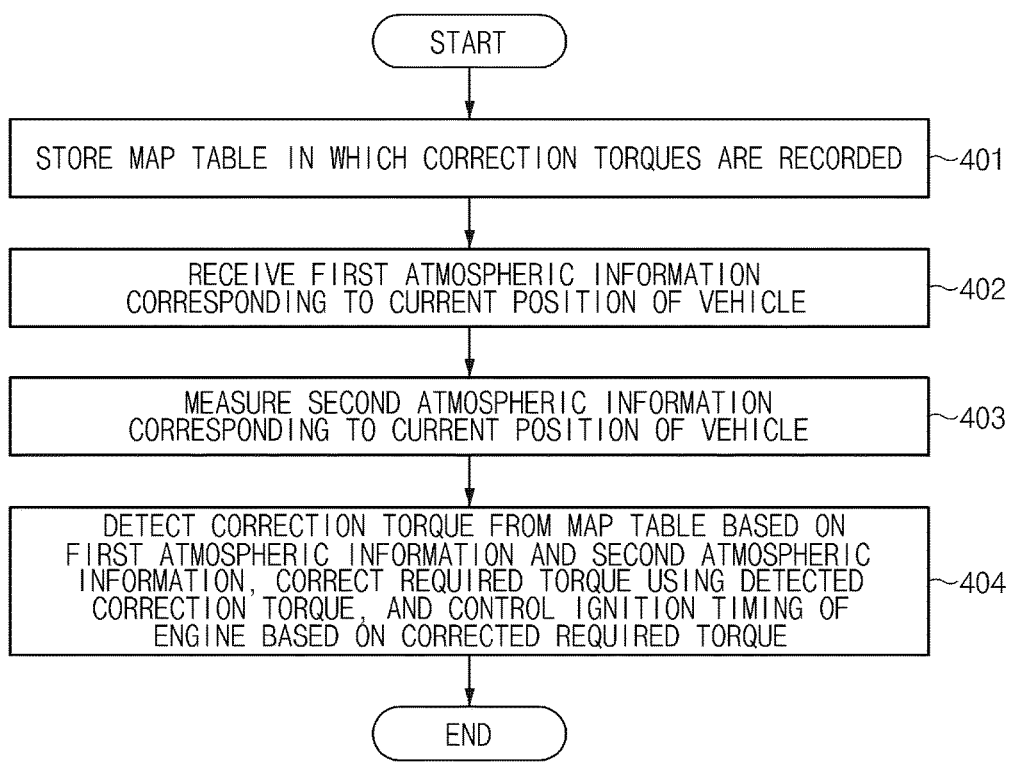
FIG. 4 illustrates a flowchart of a method for controlling an ignition timing of an engine, according to an exemplary embodiment of the present invention.

FIG. 4 illustrates a flowchart of a method for controlling an ignition timing of an engine, according to an exemplary embodiment of the present invention.

Initially, the storage 10 may store a map table in which correction torques are recorded (401).

Next, the receiver 20 may receive first atmospheric information corresponding to a current position of a vehicle (402). Here, the receiver 20 may be a navigation or a telematics terminal mounted in the vehicle.

Thereafter, the detector 30 may measure second atmospheric information corresponding to the current position of the vehicle (403).

As such, the controller 40 may detect a corresponding correction torque from the map table on the basis of the first atmospheric information and the second atmospheric information, correct a required torque using the detected correction torque, and control an ignition timing of an engine on the basis of the corrected required torque (404).

Figure 5:
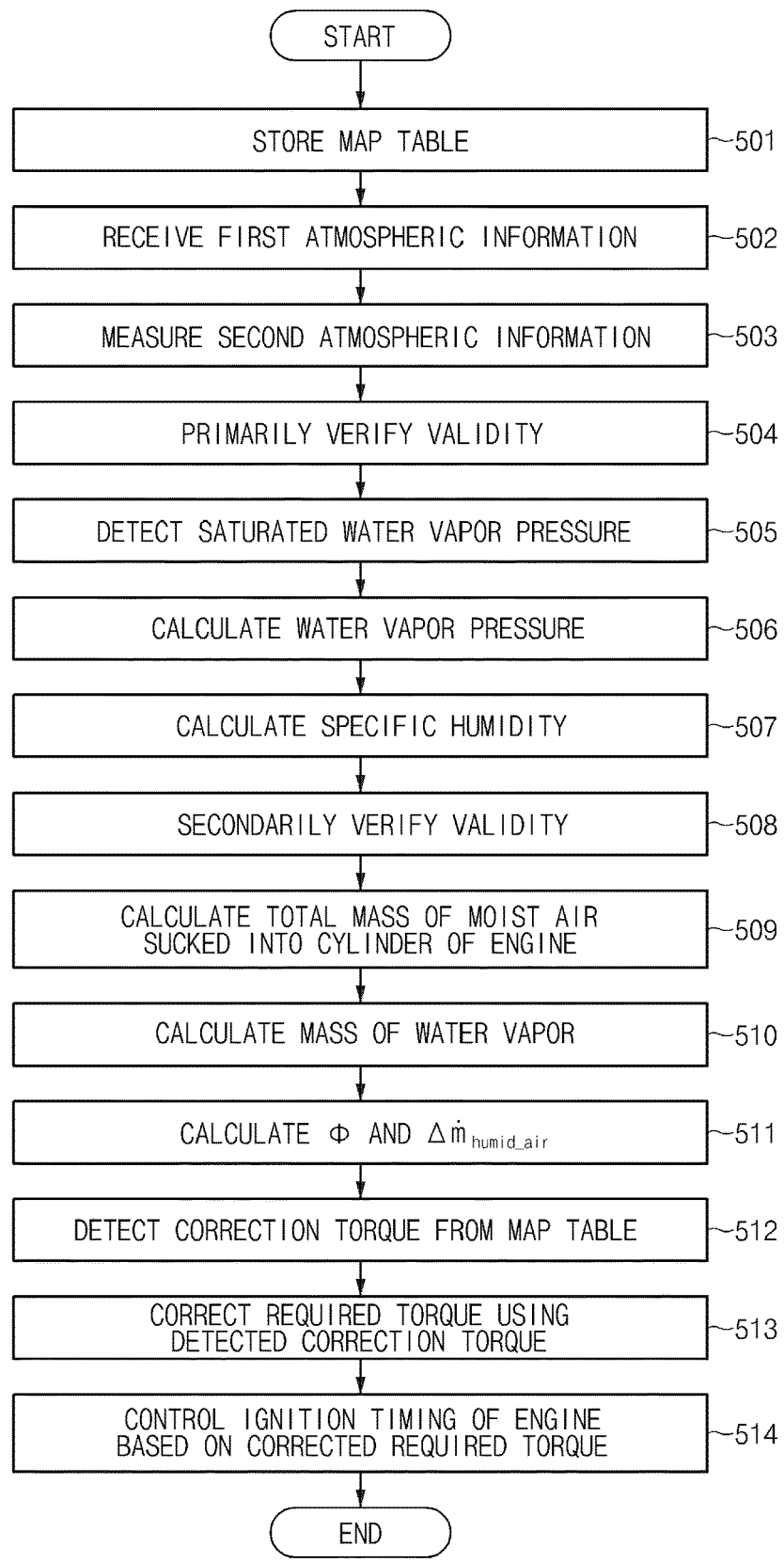
FIG. 5 illustrates a detailed flowchart of a method for controlling an ignition timing of an engine, according to an exemplary embodiment of the present invention.

FIG. 5 illustrates a detailed flowchart of a method for controlling an ignition timing of an engine, according to an exemplary embodiment of the present invention.

Initially, the storage 10 may store a map table in which correction torques (DBL variations) are recorded, each correction torque corresponding to a difference between the mass flow rate of moist air drawn into the cylinder of the engine at a current atmospheric pressure and the mass flow rate of moist air drawn into the cylinder of the engine at a standard atmospheric pressure, and a value φ=$m_{vapor}$/$m_{humid\_air}$ representing a ratio of the mass $m_{vapor}$ of water vapor to the total mass $m_{humid\_air}$ of the moist air drawn into the cylinder of the engine (501).

Next, the receiver 20 may receive first atmospheric information corresponding to a current position of a vehicle (502).

Thereafter, the detector 30 may measure second atmospheric information corresponding to the current position of the vehicle (503).

As such, the controller 40 may compare an atmospheric pressure in the first atmospheric information with an atmospheric pressure in the second atmospheric information to primarily verify the validity of the first atmospheric information and the second atmospheric information (504). Here, when a difference between the atmospheric pressure in the first atmospheric information and the atmospheric pressure in the second atmospheric information is within a predetermined threshold, the controller 40 may recognize the validity of the first atmospheric information and the second atmospheric information. When the validity is not recognized, the controller 40 may be configured to cease performing a process of correcting an ignition timing of the engine.

Thereafter, the controller 40 may be configured to detect a saturated water vapor pressure at an intake air temperature measured by the intake air temperature detector (505). Here, the controller 40 may detect the saturated water vapor pressure at the intake air temperature measured by the intake air temperature detector on the basis of a table in which saturated water vapor pressures vary according to temperatures are recorded.

As such, the controller 40 may be configured to detect a water vapor pressure $P_{vapor}$ on the basis of the detected saturated water vapor pressure $P_{sat}$ and a relative humidity HR received through the receiver 20 (506). For example, the controller 40 may determine the water vapor pressure $P_{vapor}$ using equation 1 above.

Thereafter, the controller 40 may be configured to determine a specific humidity SH using equation 2 above (507).

As such, the controller 40 may be configured to secondarily verify the validity of the specific humidity determined using equation 2 (508). For example, the controller 40 may verify the validity of the specific humidity on the basis of table 1 above. When the specific humidity determined using equation 2 does not exceed a maximum specific humidity at the intake air temperature measured by the intake air temperature detector, the controller 40 may recognize the specific humidity as valid.

Thereafter, the controller 40 may determine the total mass of the moist air drawn into the cylinder of the engine on the basis of the mass of the moist air measured by the mass airflow detector (509). Here, the controller 40 may determine the mass flow rate of the moist air drawn into the cylinder to determine the total mass $m_{humid\_air}$.

As such, the controller 40 may be configured to determine the mass $m_{vapor}$ of the water vapor on the basis of the total mass $m_{humid\_air}$ of the moist air drawn into the cylinder of the engine and the specific humidity (510). Here, the controller 40 may determine the mass $m_{vapor}$ of the water vapor using equation 4 above.

Thereafter, the controller 40 may be configured to determine a value y representing the ratio of the mass $m_{vapor}$ of the water vapor to the total mass $m_{humid\_air}$ of the moist air drawn into the cylinder of the engine, and determine a difference $\Delta \dot{m}_{humid\_air}$ between the mass flow rate moist air drawn into the cylinder of the engine at a current atmospheric pressure and the mass flow rate $\dot{m}_{humid\_air}$@Std_Patm of moist air drawn into the cylinder of the engine at a standard atmospheric pressure (511).

As such, the controller 40 may be configured to detect a correction torque corresponding to the determined values $\varphi$ and $\Delta \dot{m}_{humid\_air}$ from the map table stored in the storage 10 (512).

Thereafter, the controller 40 may be configured to correct a required torque using the correction torque (513).

As such, the controller 40 may be configured to control an ignition timing of the engine on the basis of the corrected required torque (514).

As set forth above, by correcting a required torque on the basis of a correction torque corresponding to a difference between the mass flow rate of moist air drawn into the cylinder of the engine at a current atmospheric pressure and the mass flow rate of moist air drawn into the cylinder of the engine at a standard atmospheric pressure and the ratio of the mass of water vapor to the total mass of the moist air drawn into the cylinder of the engine, an ignition timing of the engine may be determined with high accuracy, regardless of the temperature.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling an ignition timing of an engine, the apparatus comprising:
    a storage configured for storing a map table in which correction torques are recorded;
    a receiver configured for receiving first atmospheric information corresponding to a current position of a vehicle;
    a detector configured for measuring second atmospheric information corresponding to the current position of the vehicle; and
    a controller configured for detecting a corresponding correction torque from the map table on a basis of the first atmospheric information and the second atmospheric information, correcting a required torque using the detected correction torque, and controlling the ignition timing of the engine on a basis of the corrected required torque.

2. The apparatus according to claim 1, wherein the controller is configured to detect the corresponding correction torque from the map table on a basis of a mass of water vapor and a mass of moist air drawn into a cylinder of the engine.

3. The apparatus according to claim 2, wherein the controller is configured to detect the corresponding correction torque from the map table, on a basis of a difference between a mass flow rate of the moist air drawn into the cylinder of the engine at a current atmospheric pressure and a mass flow rate of the moist air drawn into the cylinder of the engine at a standard atmospheric pressure, and a ratio of the mass of the water vapor to a total mass of the moist air drawn into the cylinder of the engine.

4. The apparatus according to claim 1, wherein the first atmospheric information includes at least one of atmospheric pressure, atmospheric temperature, relative humidity, air volume, and altitude.

5. The apparatus according to claim 4, wherein the detectors includes at least one of a barometric pressure detector, an intake air temperature detector, and a mass airflow detector.

6. The apparatus according to claim 5, wherein the controller is configured to compare an atmospheric pressure in the first atmospheric information with an atmospheric pressure in the second atmospheric information to verify a validity of the first atmospheric information and the second atmospheric information.

7. The apparatus according to claim 6, wherein the controller is configured to recognize the validity of the first atmospheric information and the second atmospheric information when a difference between the atmospheric pressure in the first atmospheric information and the atmospheric pressure in the second atmospheric information is within a predetermined threshold.

8. The apparatus according to claim 5, wherein the controller is configured to verify the validity of the first atmospheric information and the second atmospheric information on a basis of a specific humidity determined using the first atmospheric information and the second atmospheric information.

9. The apparatus according to claim 8, wherein the controller is configured to recognize the validity of the first atmospheric information and the second atmospheric information unless the determined specific humidity exceeds a maximum specific humidity at an intake air temperature measured by the intake air temperature detector.

10. A method for controlling an ignition timing of an engine, the method comprising steps of:
   storing, by a storage, a map table in which correction torques are recorded;
   receiving, by a receiver, first atmospheric information corresponding to a current position of a vehicle;
   measuring, by a detector, second atmospheric information corresponding to the current position of the vehicle; and
   detecting, by a controller, a corresponding correction torque from the map table on a basis of the first atmospheric information and the second atmospheric information, correcting a required torque using the detected correction torque, and controlling the ignition timing of the engine on a basis of the corrected required torque.

11. The method according to claim 10, wherein the controlling step includes detecting the corresponding correction torque from the map table on a basis of a mass of water vapor and a mass of moist air drawn into a cylinder of the engine.

12. The method according to claim 11, wherein the controlling step includes detecting the corresponding correction torque from the map table, on a basis of a difference between a mass flow rate of the moist air drawn into the cylinder of the engine at a current atmospheric pressure and a mass flow rate of the moist air drawn into the cylinder of the engine at a standard atmospheric pressure, and a ratio of the mass of the water vapor to a total mass of the moist air drawn into the cylinder of the engine.

13. The method according to claim 10, wherein the first atmospheric information includes at least one of atmospheric pressure, atmospheric temperature, relative humidity, air volume, and altitude.

14. The method according to claim 13, wherein the detector includes at least one of a barometric pressure detector, an intake air temperature detector, and a mass airflow detector.

15. The method according to claim 14, wherein the controlling step includes verifying a validity of the first atmospheric information and the second atmospheric information by comparing an atmospheric pressure in the first atmospheric information with an atmospheric pressure in the second atmospheric information.

16. The method according to claim 15, wherein the controlling step includes recognizing the validity of the first atmospheric information and the second atmospheric information when a difference between the atmospheric pressure in the first atmospheric information and the atmospheric pressure in the second atmospheric information is within a predetermined threshold.

17. The method according to claim 14, wherein the controlling step includes verifying the validity of the first atmospheric information and the second atmospheric information on a basis of a specific humidity determined using the first atmospheric information and the second atmospheric information.

18. The method according to claim 17, wherein the controlling step includes recognizing the validity of the first atmospheric information and the second atmospheric information unless the determined specific humidity exceeds a maximum specific humidity at an intake air temperature measured by the intake air temperature detector.

* * * * *